Patented Mar. 23, 1926.

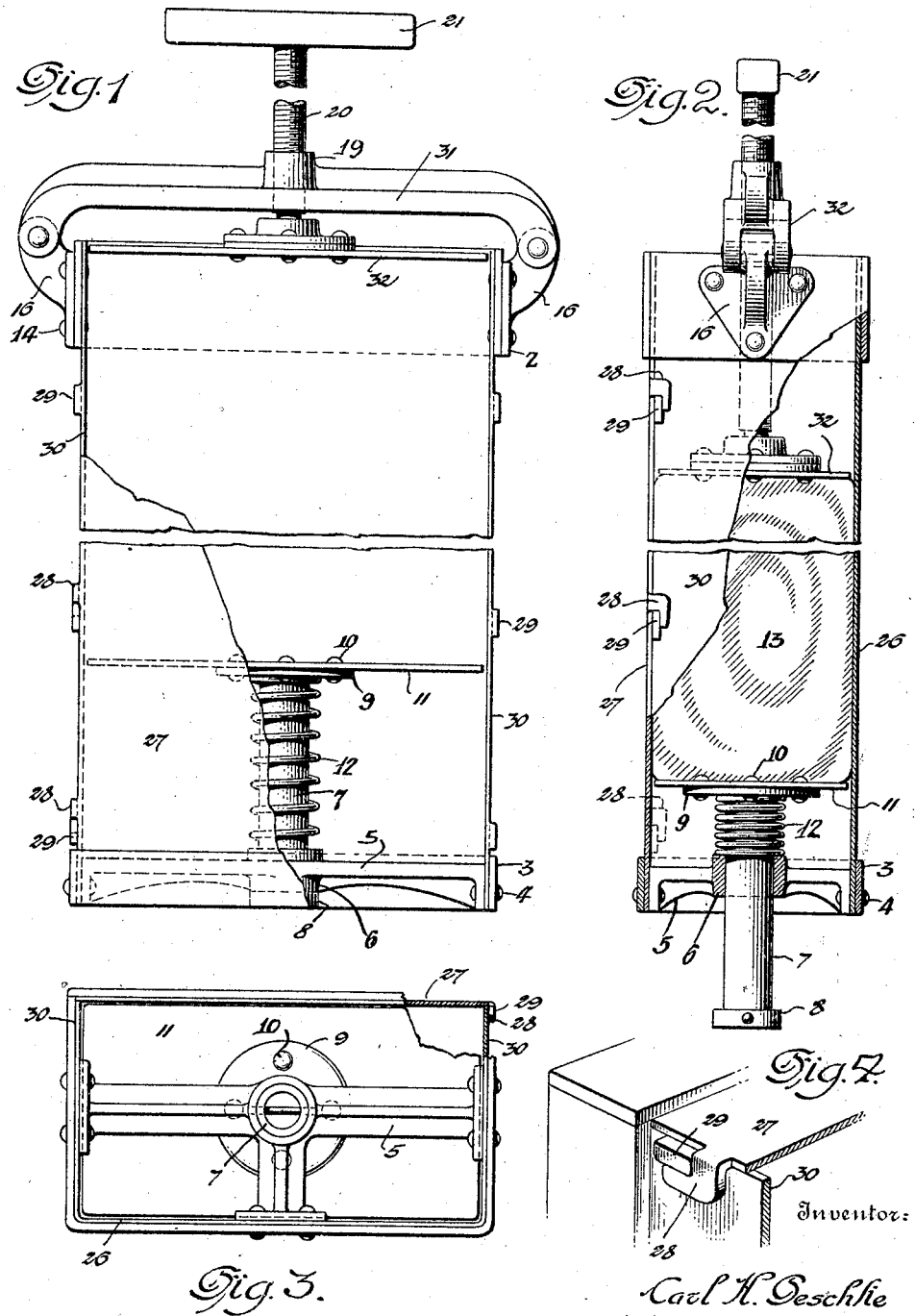

1,577,851

UNITED STATES PATENT OFFICE.

CARL H. PESCHKE, OF DETROIT, MICHIGAN.

MEAT CONTAINER.

Application filed February 8, 1924. Serial No. 691,338.

*To all whom it may concern:*

Be it known that I, CARL H. PESCHKE, a citizen of Germany, residing at Detroit, in the county of Wayne and State of Michigan, have invented certain new and useful Improvements in Meat Containers, of which the following is a specification, reference being had therein to the accompanying drawings.

This invention relates to a meat container, and has special reference to that type of container in which one or more pieces of meat may be placed, subjected to pressure for shaping and holding purposes, while the meat is being cooked. My meat container has been especially designed for boiling hams which are boned, placed under pressure, and boiled, the hams being subjected to pressure to hold the boned meat together during boiling. It is the present practice to use a large vat in which hams are placed and a pressure board placed on the hams, but on account of some boned hams being irregular, small or large, is not at all times possible to subject all the hams to a uniform pressure, therefore some of the hams when boiled are not as compact as they should be.

My invention aims to provide a ham boiler in which one or more boned hams may be positively shaped and subjected to uniform pressure during a boiling operation, the boiler being in the form of a container that may be easily handled and maintained in a sanitary condition.

The construction entering into my meat container will be hereinafter specifically described and then claimed, and reference will now be had to the drawing wherein—

Fig. 1 is a front elevation of the meat container, partly broken away;

Fig. 2 is a side elevation of the same partly broken away and partly in section;

Fig. 3 is a view of one end of the container, and

Fig. 4 is a perspective view of a portion of the container.

In the drawing, the reference numeral 26 denotes a metallic shell or container body which is oblong in cross section and mounted on the open ends of the shell 1 are reinforcing bands 2 and 3 which protect and add rigidity to the end edges of the shell.

The band 3 may be attached to the shell 1 by rivets 4 and these same rivets are adapted to hold a spider 5 within the end of the shell 1, said spider having a central sleeve boss 6. Slidable in the sleeve boss is a hollow plunger 7 which has its outer end provided with a fixed collar 8 adapted to abut the boss 6 and limit the inward movement of the plunger 7. The inner end of the plunger 7 has a peripheral flange 9 and connected to said flange by rivets 10 or other fastening means is a pressure head 11. The head 11 has its edges in proximity to the inner walls of the shell 1, and surrounding the plunger 7, between the flange 9 and the boss 6, is a coiled compression spring 12. The expansive force of this spring holds the pressure head 11 so that said head may yield when one or more pieces of meat 13 are placed in the container, the spring being shown under compression in Fig. 2.

The band 2 may be connected to the shell 1 by rivets 14 and some of said rivets may be employed for attaching brackets 16 to opposed walls of said shell. Connected to the brackets 16 is a bar 31.

Centrally of the bar 31 is a sleeve boss 19 having its inner wall screwthreaded for a screw 20, said screw having its outer end formed with a handle 21 to facilitate rotation of said screw. On the inner end of the screw 20 is a pressure head 32.

When the screw 20 is adjusted the pressure head 32 can crowd the meat towards the pressure head 11. As the screw 20 is rotated the meat can be placed under pressure with the head 11 yielding to excessive pressure, and said heads will cooperate with the walls of the shell 26 in shaping the meat 13.

The meat container is adapted to be placed in boiling water and since the pressure heads do not snugly fit against the walls of the shell 1 it is obvious that the boiling water may reach the meat and should the meat swell or tend to expand the yieldable pressure head 11 will permit of such swelling, yet prevent the meat from losing its shape after having been boiled and removed from the container.

In order that the meat 13 may be easily placed in the container, the shell 26 has a detachable front wall 27 with the longitudinal edges of said wall provided with hook members 28 adapted to engage lug or keeper members 29 carried by the longitudinal side walls 30 of the shell.

The hook shaped members 28 extend in the direction pressure is to be manually applied to meat within the container, so that frictional engagement between the meat and the detachable front wall 27 will cause the hooked shape members 28 to seat on the keepers 29, thus obviating the necessity of providing any other holding means than that shown for the detachable front wall 27. With this wall detachable it is an easy operation to place hams or other pieces of meat in the container between the pressure heads and when the detachable wall is placed in position the meat may be subjected to pressure.

What I claim is:—

1. A container for boiling meat, comprising a shell, a detachable front wall carried by said shell, a spider in one end of said shell, a slidable centrally located plunger having a limited movement in said shell, a pressure head in said shell supported by said plunger, a bar connected to the opposite end of said shell, an adjustable screw carried by said bar, and a pressure head carried by said screw and adapted to be shifted into said shell to cooperate with the plunger pressure head in subjecting meat to pressure within said shell.

2. A container for boiling meat comprising a shell having a detachable front wall, a yieldable plunger having a limited movement in the bottom of said shell, a pressure head supported in said shell by said plunger, and manually operated pressure means at the opposite end of said shell adapted to cooperate with said pressure head in holding meat to form in said shell.

3. A container for boiling meat comprising a shell, a detachable front wall on said shell, yieldable meat supporting means in one end of said shell, manually operated pressure means in the opposite end of said shell adapted to cooperate with said yieldable meat supporting means in holding meat to form in said shell, and means articulating said shell and said detachable wall so that pressure applied to meat in said shell tends to clamp said wall on said shell.

In testimony whereof I affix my signature.

CARL H. PESCHKE.